(12) United States Patent
Otto et al.

(10) Patent No.: US 7,018,229 B2
(45) Date of Patent: Mar. 28, 2006

(54) TERMINAL BLOCK AND DISTRIBUTION POINT

(75) Inventors: Dieter Otto, Wipperfuhrt (DE); Bernhard Schneider, Herne (DE); Klaus-Dieter Burmeister, deceased, late of Wuppertal (DE); by Claudia Burmeister, legal representative, Wuppertal (DE); Bernd Lindenbeck, Wuppertal (DE); Bettina Trenkmann, Bochum (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/472,019

(22) PCT Filed: Dec. 21, 2001

(86) PCT No.: PCT/EP01/15283

§ 371 (c)(1),
(2), (4) Date: May 6, 2004

(87) PCT Pub. No.: WO02/076109

PCT Pub. Date: Sep. 26, 2002

(65) Prior Publication Data

US 2004/0242081 A1 Dec. 2, 2004

(30) Foreign Application Priority Data

Mar. 16, 2001 (DE) .......................... 201 04 605

(51) Int. Cl.
*H01R 13/629* (2006.01)

(52) U.S. Cl. .................................... 439/381
(58) Field of Classification Search .............. 439/381, 439/131, 709, 708, 710, 922, 941; 379/399, 379/93.09, 413; 361/826, 896; 370/327, 379
See application file for complete search history.

(56) References Cited

U.S. PATENT DOCUMENTS

| | | | |
|---|---|---|---|
| 4,763,226 A | 8/1988 | Pelletier | |
| 4,766,521 A | 8/1988 | Pelletier | |
| 4,975,072 A | 12/1990 | Afshar | |
| 5,451,170 A * | 9/1995 | Suffi | 439/404 |
| 5,889,856 A * | 3/1999 | O'Toole et al. | 379/399.02 |
| 5,991,140 A | 11/1999 | Hughes et al. | |
| 6,137,866 A * | 10/2000 | Staber et al. | 379/93.06 |
| 6,168,458 B1 * | 1/2001 | Kraft | 439/488 |
| 6,438,226 B1 * | 8/2002 | Guenther et al. | 379/413.04 |

FOREIGN PATENT DOCUMENTS

| | | |
|---|---|---|
| EP | 0 831 624 | 3/1998 |
| EP | 0 891 067 | 1/1999 |
| EP | 0 909 102 | 4/1999 |
| EP | 1 093 308 | 4/2001 |
| WO | WO 97/37458 | 10/1997 |
| WO | WO 98/20702 | 5/1998 |
| WO | WO 98/36541 | 8/1998 |
| WO | WO 01/45452 | 6/2001 |
| WO | WO 01/80574 | 10/2001 |
| WO | WO 01/97532 | 12/2001 |

OTHER PUBLICATIONS

Specifications and Performance Criteria, ADSL Splitter Block S 5000, Corning, Copyright 2000, 4 pages.

Maxwell, Kim, "Asymmetric Digital Subscriber Line: Interim Technology for the Next Forty Years", IEEE Communications Magazine, Oct. 1996, pp. 100–106.

* cited by examiner

*Primary Examiner*—Alexander Gilman
(74) *Attorney, Agent, or Firm*—James J. Trussell

(57) ABSTRACT

A terminal block (64) of a telecommunications distribution point comprises at least one group of subscriber contacts, at least one group of XDSL contacts, at least two groups of backbone contacts, each backbone contact of the first group being connected to a backbone contact of the second group, and at least one splitter assembly (32) connected to the subscriber contacts, the XDSL contacts and the backbone contacts of the first and/or second group. A distribution point comprises at least one such terminal block.

18 Claims, 5 Drawing Sheets

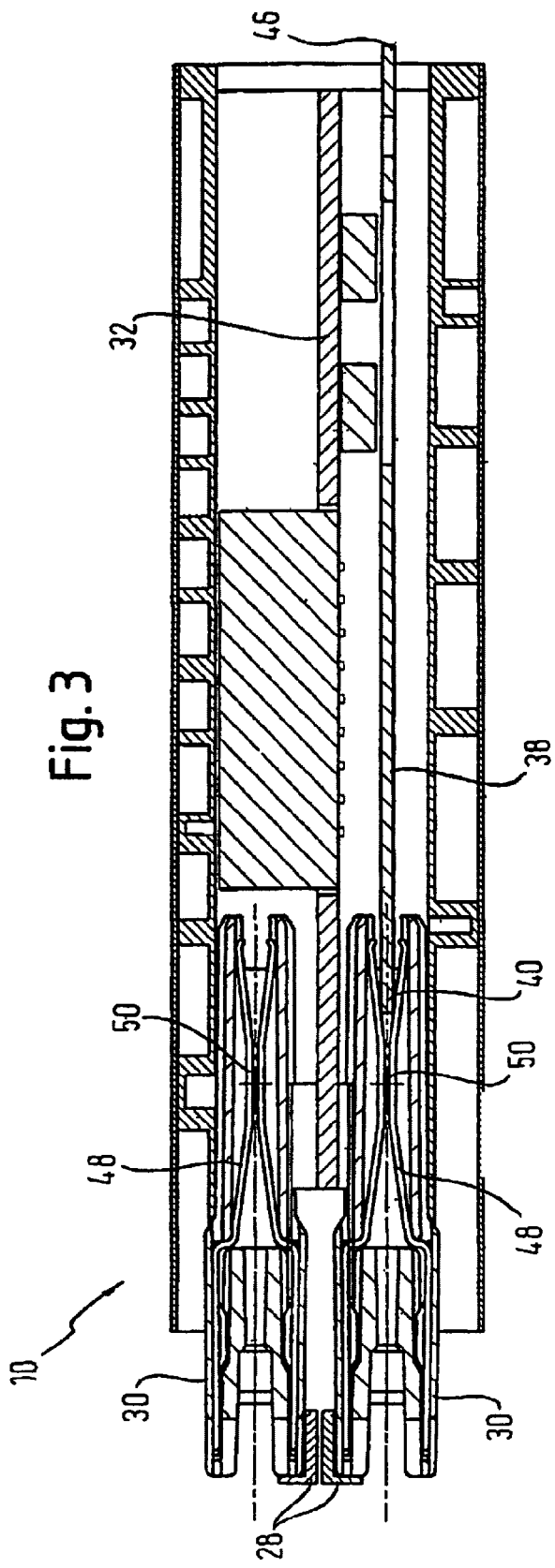

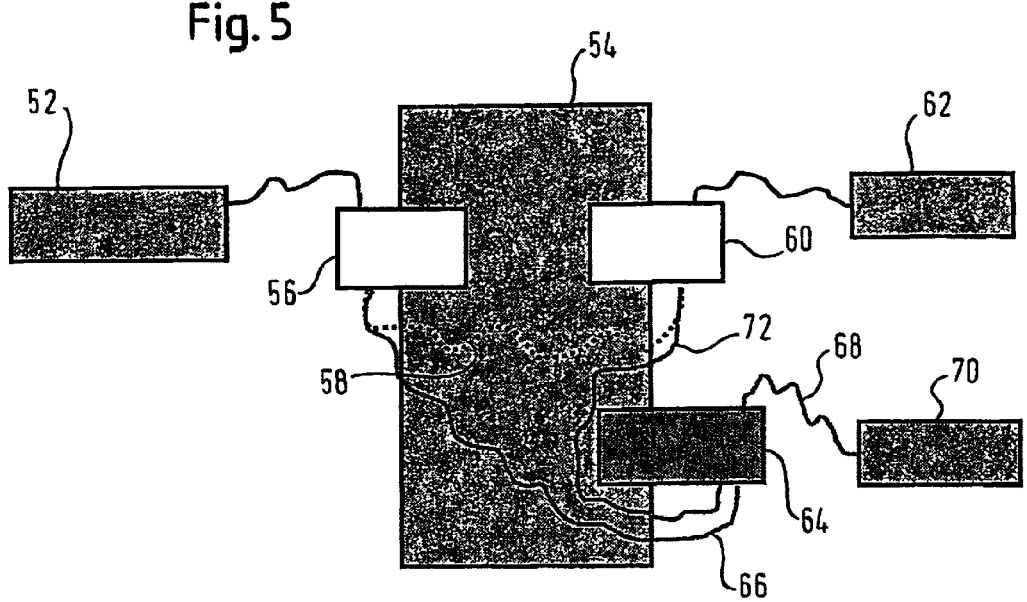
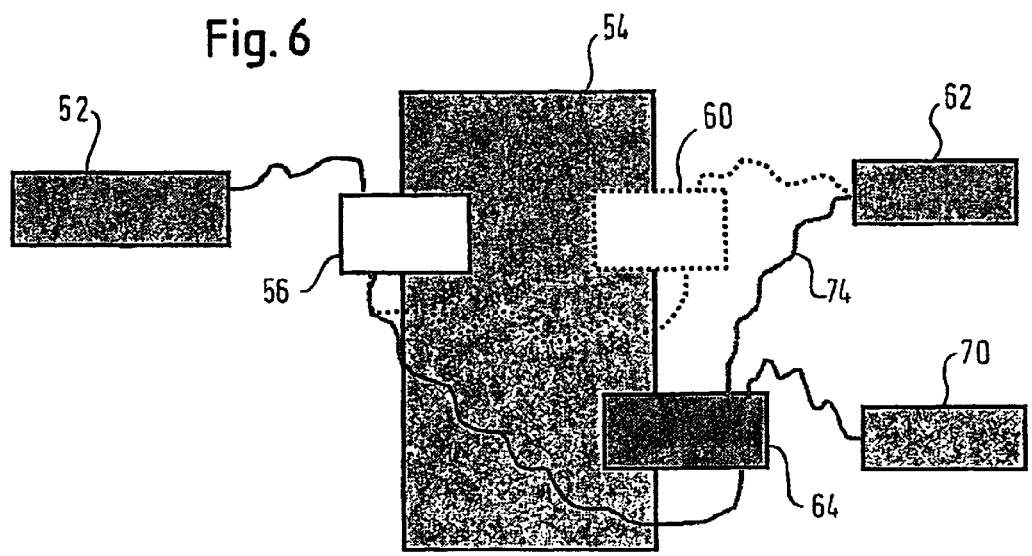

TERMINAL BLOCK AND DISTRIBUTION POINT

FIELD OF THE INVENTION

The invention relates to a telecommunications distribution point terminal block and to a distribution point including a terminal block in accordance with the invention.

In telecommunications distribution points, more particularly main distribution frames, the subscriber lines are preferably flexibly connected to the backbone or Plain Old Telephone Service (POTS) lines leading to an exchange (central office). For this purpose both the subscriber lines and the backbone lines are applied to suitable termination modules, more particularly terminal blocks and flexibly interconnected by patch (cross-connect) panels. New services needing to be communicated to and from individual subscribers require connecting subscribers not only to the conventional exchange (central office) facilities but also to means as needed for communicating new services such as, for example, ADSL, XDSL or broadband services such as, for example, DSLAMs (Digital Subscriber Line Access Multiplexers). For splitting the signals coming from a subscriber, splitters or splitter assemblies are needed, i.e. high and/or low-pass filters substantially acting as a cross-over network for passing the signals of a specific frequency range to the backbone lines and the signals of other frequency ranges to lines designated XDSL lines in this context.

BACKGROUND

EP 0 909 102 A2 discusses how to arrange a splitter assembly in a main distribution frame. In this arrangement, several splitters, consisting of circuit boards on which the necessary components are mounted, are arranged behind a field of pins serving in the termination system. There is a need for improving this type of arrangement to render it more flexible and compatible with existing facilities.

Furthermore, there exists a splitter block termed ADSL splitter block S5000 made by Corning Cables Systems that has terminating backbone subscriber and XDSL lines, each together with an electronic splitter assembly, integrated in a block.

SUMMARY OF THE INVENTION

The invention is directed to providing a terminal block with an integrated splitter for added flexibility.

The invention provides a terminal block of a telecommunications distribution point comprising at least one group of subscriber contacts, at least one group of XDSL contacts, at two least two groups of backbone contacts, each backbone contact of the first group being connected to a backbone contact of the second group, and at least one splitter assembly connected to the subscriber contacts, said XDSL contacts and said backbone contacts of said first and/or second group.

In the context of this patent, the term "XDSL" describes any DSL technology based on the ADSL (asymmetric digital subscriber line) technology, which is referred to as, for example, SDSL, HDSL, TDSL etc. In general, these technologies may be designated as "methods involving isolated frequency positions" in which different signals are communicated which must be split at the given time. The telecommunications distribution point terminal block comprises at least four groups of contacts. These groups may be grouped together in a module of the block. A first group of contacts provided for terminating the subscriber lines (and their contacts) are called "subscriber contacts". A second group provided for terminating XDSL lines (and their contacts) is called "XDSL contacts".

A third and a fourth group of contacts are provided for terminating backbone lines and are called "backbone contacts". Each group of contacts comprises roughly the same number of contacts. Thus, the backbone contacts are, in effect duplicated and, as will subsequently be detailed, this improves flexibility. It is to be noted that the "backbone contacts" of the two groups are connected to each other so that a backbone line may be optionally terminated by one or the other backbone contact of an interconnected pair of backbone contacts.

The terminal block in accordance with the invention comprises an electronic splitter assembly comprising one or more circuit boards, which is connected to the subscriber contacts, the XDSL contacts and at least one backbone contact. The splitter assembly splits the signals communicated, for example, by the subscriber line, arriving at the subscriber contacts, to the backbone contacts and the XDSL contacts. In the reverse direction the various signals are likewise brought together. It is to be noted that the invention is by no means limited to a specific method or technology involving isolated frequency, but displays its advantages generally whenever the signals communicated via one single conductor must be split at the given time. Therefore, the term "XDSL contact" must be interpreted in a broad manner.

As mentioned above, due to the fact that the splitter assembly is connected to at least one group of backbone contacts, and the two groups of backbone contacts can be connected to each other, a backbone line can be terminated at any backbone contact of an interconnected pair. It is to be noted in this context that it is preferable that the group of subscriber contacts and the first group of backbone contacts are arranged in a single row of contacts in the terminal block, and that the XDSL contacts and the second group of backbone contacts be arranged in a single row in the terminal block. The row of subscriber contacts and of the first group of backbone contacts is also preferably located in the terminal block below the row of XDSL and the second group of backbone contacts. In other words, in both the upper row and lower row, backbone contacts exist, and each backbone contact is interconnected to a backbone contact in the other row, as detailed below. Against the background of the common architecture of distribution points this results in the following advantages.

When a distribution point needs to be newly configured by means of the terminal block, the subscriber lines are brought to the underside of the terminal block. In other words, the subscriber lines are applied as usual from the so-called "cross-connect side" formed by the lower contact row of a terminal block. The upper contact row of the terminal block is used to terminate the backbone lines, on the one hand, and the XDSL lines on the other. In this context, the backbone contacts of the so-called "third group" in the lower contact row remain free.

However, these unconnected backbone contacts in the lower row can be used to "loop in" the splitter when the terminal block is to be combined with backbone modules, which are already installed and in use. In this case, the existing backbone module can be left as it is and the subscriber lines can be terminated as usual from the cross-connect side to the contacts of the terminal block. For looping in the terminal block with the splitters, the existing cross-connect between the subscriber and the existing backbone module is opened up and the backbone line is likewise terminated at the cross-connect side, i.e. from underneath at the contacts of the third group of the terminal block. In other words, existing backbone modules are cross-connected to the terminal block and retain the common architecture of a distribution point, namely terminating cross-connect lines from underneath and passing them on to the right of the blocks. In this case, the backbone contacts of the so-called fourth group, located in the upper contact row of the terminal block, remain free.

Since, as already mentioned, each contact of the third and fourth group of backbone contacts is connected to the other, it is assured in this case too, that a subscriber line is connected to both an XDSL line and to a backbone line. Unlike the configuration when a distribution point needs to be newly fitted, looping in a splitter as described results in the backbone lines thus being led out via the cross-connect side, i.e. as usual downwards and to the right. Accordingly, the terminal block enhances flexibility as regards terminating backbone lines for better handling and a neater arrangement. In addition, the isolating arrangement permits testing to advantage.

It is preferred that at least one group of contacts, preferably the group of subscriber contacts, consist of electrically separating, disconnecting or isolating contacts, which is of advantage for the terminal block because the subscriber line may be separated, disconnected or isolated for testing and the remaining contacts and the lines terminated thereby can be isolated for testing.

Basically any arrangement of the first to fourth group of contacts is conceivable, it being this configuration and the possibility of terminating the backbone lines to various contacts that already permits a neat arrangement with added flexibility. However, as already mentioned, it is preferred that the subscriber contacts and a group of backbone contacts are provided in a common row, preferably forming the lower row of the terminal block. Accordingly, the XDSL contacts and the contacts of the second group of backbone contacts are provided in a common row, preferably the upper contact row of the terminal block. In this arrangement it is furthermore preferred that the backbone contacts of both rows are arranged one above the other so that they can be connected to each other in a neat arrangement for terminating the backbone lines thereto.

For the connection between the backbone contacts of the two groups any configuration is conceivable, it being preferred, however, that the splitter assembly is configured such that it connects the backbone contacts of the two groups to each other. The splitter assembly in this embodiment not only splits the signal on the subscriber line side to the XDSL line, on the one hand, and the backbone line, on the other, but also connects between the first and second group of backbone contacts so that optionally the backbone lines can be terminated by the backbone contacts of both groups.

Basically any optional configuration is conceivable for the splitter assembly. More particularly each of the contacts of the terminal block can be fixedly connected to the splitter assembly or the circuit board conductors or components thereof. It is, however, particularly good practice as regards making use of tried-and-tested contacts for the terminal block, when the splitter assembly comprises its own contacts for connecting the contacts of the terminal block separately therefrom.

It is more particularly preferred that the contacts of the splitter assembly are electrically connected directly to the contacts of the terminal block. In other words, it is not necessary, as usually required in prior art, to connect the terminating contacts of the terminal block to an edge connector or the like into which the splitter assembly can be plugged with its contacts. Instead, the contacts of the splitter assembly extend in the direction of the front side of the terminal block such that they are directly electrically connected to the contacts of the terminal block. It is to be noted in this context that a particularly advantageous embodiment consists of configuring all contacts of the terminal block as isolating contacts so that at each front side of the isolating contact the lines can be terminated in contact with each second side of the isolating contact connecting the contacts of the splitter assembly. Due to the contacts usually being arranged in two rows, a double module, so-to-speak, consisting of two rows of isolating contacts, materializes in the embodiment in which all contacts are provided as isolating contacts. More particularly lines can be terminated at the outer "halves" of the isolating contacts whilst no lines should be terminated at "inner" halves, they, for example, being covered by suitable means. In this case, however, contacts of the splitter assembly can be electrically connected to each inner "half" of the isolating contacts in the interior or, as regards the contacts, therebehind.

As already mentioned above, the splitter assembly is preferably provided behind the contacts in the terminal block, thus distinguishing it from prior art configurations in which several terminal blocks can be sandwiched with splitter assemblies arranged inbetween, resulting in an assembly that is relatively thick. In contrast, the invention permits a more compact assembly because the splitter assembly may be located behind the contacts. In this context, the term "behind" is to be construed to the effect that a front side of the terminal block is formed on that side, where the subscriber contacts, the XDSL contacts and the backbone contacts are exposed so as to permit the connection of cables thereto. In relation to this exposed front side of the block, the splitter assembly is preferably arranged behind the mentioned contacts of the terminal block.

It is good practice when terminating the terminal block with lines which can be shielded and, as pairs, comprising shielding wires, that a further group of contacts is provided which serve as shielding wire contacts. These shielding wire contacts are located generally in the vicinity of the subscriber contacts so that the shielding wires of the subscriber lines can be terminated there. Grounding the shielding wires is done in this case by the terminal block additionally comprising a grounding means in contact with the shielding wire contacts. In addition, the grounding means is configured so that a section thereof is in contact with a tray made of metal or with a portion of the rack mounting system so that the voltage induced in the shielding wires can be grounded.

In addition, the grounding means provided additionally may serve as a shielding means when provided, as preferred, over a full surface area, for example in the form of a substantially flat sheet having no substantial openings, it being in this way that in the vicinity of the splitter assembly a grounding plate provided parallel to the circuit board of the splitter assembly is located which shields the individual splitter assemblies of a terminal block from each other. As an alternative, it may be of advantage in specific applications that the grounding means comprises openings to accommodate any relatively thick or tall components of the splitter assembly (which are provided on a circuit board arranged in parallel with the shielding means).

It is furthermore preferred that the grounding means comprises supporting means for supporting at least one circuit board. As regards the grounding means which is preferably provided as a largely flat grounding plate, reference is further made to the application "Grounding Plate and Telecommunications Module including a Grounding Plate and Telecommunications Rack-Mounting System including a Module" as filed by the applicant on the same date, which disclosure is herein incorporated by reference.

For a neat arrangement in guiding the various lines it is preferable that the terminal block features further comprises wire guides. These may be configured, for example, so that they guide, in accordance with typical distribution point architecture, the lines at the lower side, i.e. the cross-connect side, to the right and the lines at the upper side, i.e. the cabling side, to the left. In this arrangement, it is preferred that the wire guides of the upper side of each module, i.e. at the cabling side, are configured smaller than those at the lower side, i.e. at the cross-connect side, since the cross-connect lines are usually shielded and thus feature a greater diameter.

It is particularly preferred in this context to provide the wire guides as conduits adapted for guiding each pair.

Although the terminal block in accordance with the invention can also be put to use to advantage by itself, it is preferred in accordance with the invention to provide a complete distribution point, preferably a main distribution frame, with at least one such terminal block.

BRIEF DESCRIPTION OF THE DRAWINGS

The invention will now be detailed by way of example embodiments as shown in the drawings in which

FIG. 3 is a cross-section view of the section as shown in FIG. 1;

FIG. 4 is a wiring diagram of the terminal block in accordance with the invention;

FIG. 5 is a diagrammatic illustration of a first alternative for using the terminal block in accordance with the invention in a distribution point;

FIG. 6 is a diagrammatic illustration of a second alternative for using the terminal block in accordance with the invention in a distribution point.

DETAILED DESCRIPTION OF A PREFERRED EMBODIMENT OF THE INVENTION

Figure 1:
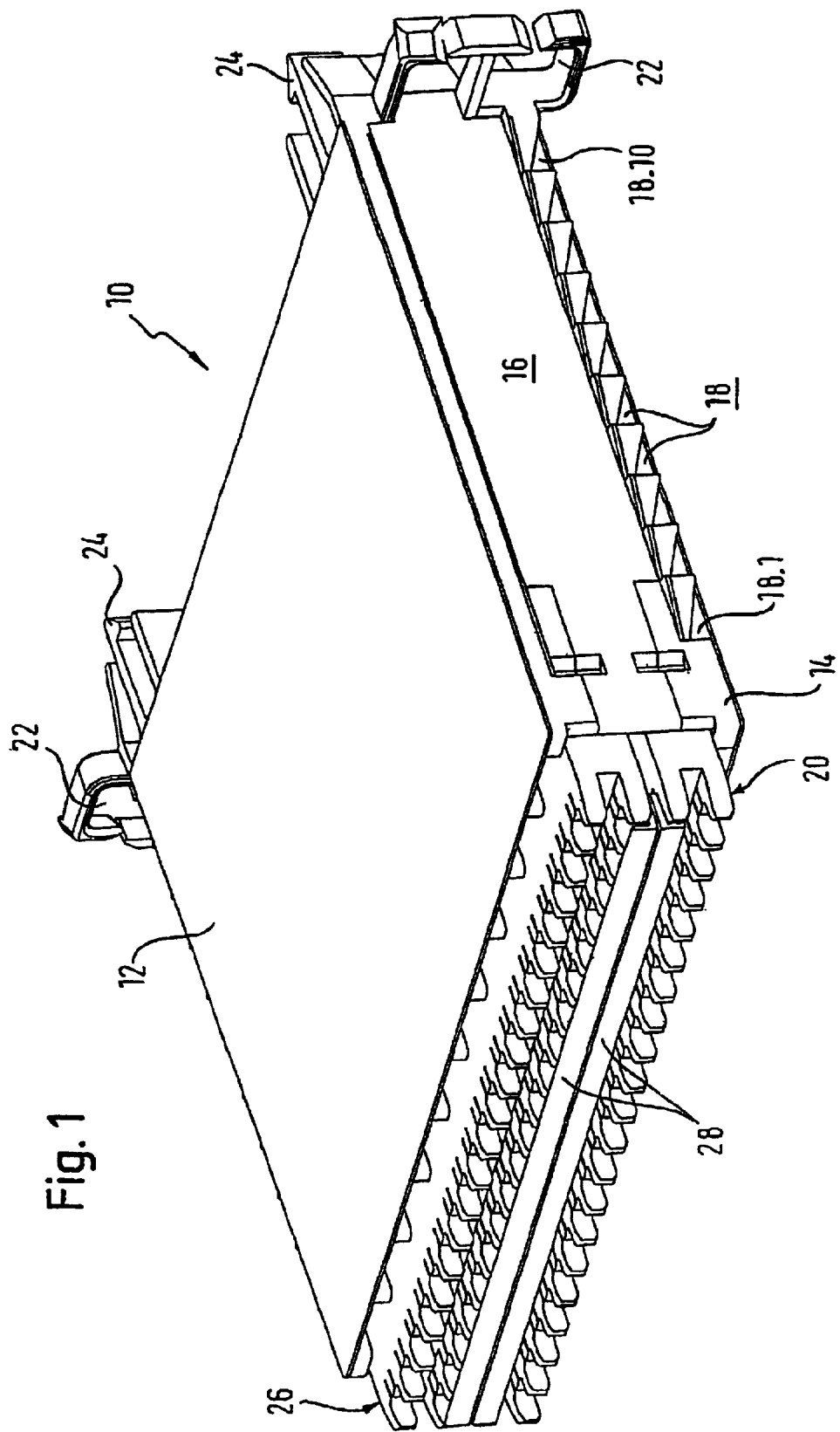
FIG. 1 is a view in perspective of a section or module of the terminal block in accordance with the invention.

Referring now to FIG. 1 there is illustrated the terminal module 10 as part of the terminal block comprising substantially a housing formed by upper 12 and lower wire guiding means 14 as well as by two side plates 16. As evident on the right of FIG. 1, there are configured in each wire guiding means 14 of the embodiment as shown ten conduits 18 provided for accommodating one pair (not shown) each and guiding each pair to the contacts at the front side of the module 10. The conduit output 18.1 is guided to the rightmost contact pair of the lower contact row 20. The conduit output 18.10, configured as shown in FIG. 1, guides a pair (not shown) to the leftmost contact pair of the contact row 20. This configuration ensures for the lower contact row of the module 10 that the lines are guided to the right as is usual in common and tried-and-tested architecture for the cross-connect side provided at the lower side on a module. Likewise the wire guide means 12 at the upper side is configured such that the pairs guided in the ducts indicated individually are guided to the left-hand side. In the rear portion of the module 10, wire guides 22 are provided, on the one hand, for bundled line guidance whilst, on the other, latching means 24 are evident at the rear side of the terminal module 10 with which the module can be suitably rack-mounted.

In the embodiment as shown in FIG. 1 there are provided at the front side substantially two rows of contacts, a lower contact row 22 and an upper contact row 26, all contacts of which in the embodiment as shown are provided as isolating contacts as detailed in the following. Furthermore, the contacts are configured as IDC contacts, meaning that they feature a contact slot into which a cable can be urged so that the insulation is opened up at least in part and the contact subsequently electrically conductively connected to the core. In this context, it is preferred for specific applications that the contacts used comprise two contact slots arranged juxtaposed, in other words two juxtaposed IDC zones so that two conductors can be terminated juxtaposed. However, in the embodiment as shown only the "outer" halves of the isolating contacts are used in each case for terminating the cables. In other words, it is only to the upper sections of the contacts of the upper row 26 and to the lower sections of the lower row 20 that the lines are terminated. Each two internal portions of the contacts are covered to advantage by two substantially L-shaped marking strips 28. It is due to this configuration that the module 10 as shown can be termed configured as a double module since substantially two isolating modules having isolating contacts of tried-and-tested description are used to form the contact rows. Accordingly all contacts are configured as isolating contacts to advantage in the embodiment as shown so that facilitated means of testing materialize. As already mentioned the internal sections of each of the isolating contacts are not used for line termination, but for connecting the contacts of a splitter assembly.

Figure 2:
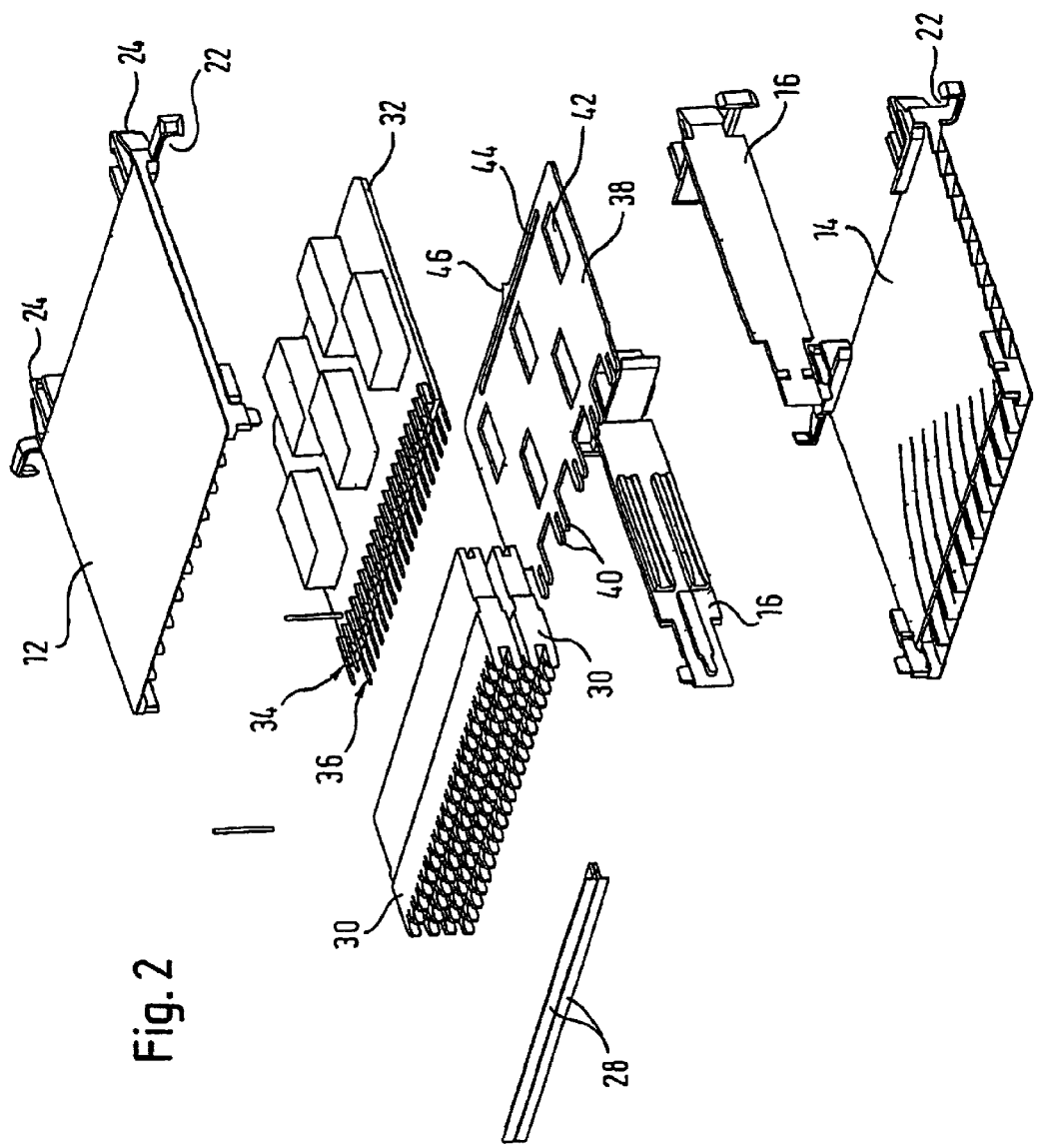
FIG. 2 is an exploded view in perspective of the section as shown in FIG. 1.

Referring now to FIG. 2 there is illustrated how this is achieved in showing the configuration of the module whose housing is formed by the upper 12 and lower guiding means 14. As evident from FIG. 2 this guiding means comprises in each case part of the side wire guides 22 and the rear latching means 24. These parts are supplemented by the side parts 16 comprising the remaining sections of these cited means. Accommodated in the interior of the housing and more particularly facing to the front side of the module 10 are the two isolating modules 30, the contacts of which are made use of by the ways and means as described. Evident in addition in FIG. 2 is how the marking strips 28 are provided to cover the inner neighboring contact rows of the isolating modules 30.

Provided in a portion behind the isolating modules 30 is the splitter assembly 32 formed substantially by a circuit board with the filter components mounted and electrically connected thereon. In the embodiment as shown at the front side the splitter assembly comprises two rows of contacts, an upper row 34 and a lower row 36. As to be detailed later, the contacts of the lower row 36 are electrically conductively connected to the contacts of the isolating modules 30 through openings (not shown in FIG. 2) in the inner surface area of the lower isolating module 30. Furthermore the contacts of the upper row 34 are electrically conductively connected to the inner portions of the contacts of the isolating module 30 via openings in the inner surface area of the upper isolating module 30.

For one thing, the contacts of the splitter assembly ensure a connection for the stacked arrangement of the contacts of the isolating modules 30, each of which is provided for terminating backbone lines to thus enhance the flexibility in terminating and, for another, the contacts of the splitter assembly are connected to the subscriber contacts of the lower isolating module 30 such that an incoming signal is guided by suitable ways and means through the filter components in being split to contacts of the upper contact row 34 in contact with the backbone contacts, and to the contacts of the upper contact row 34 connecting XDSL contacts. It is to be noted furthermore that the splitter assembly of the terminal block in accordance with the invention is a passive filter and not an active filter in the form of, for example, a multiplexer.

Evident in addition from FIG. 2 is a grounding plate 38 serving as a grounding means which comprises at its front side predominantly fingerlike contacts 40 which in the example embodiment as shown are electrically conductively connected to a few contacts of the lower isolating module 30. These contacts of the lower isolating module 30 are provided as shielding wire contacts to which the shielding wires of the terminated pairs can be terminated. Via the shielding wire contacts and grounding plate 38 the voltage induced in the shielding wires can be dropped to ground. In this arrangement the grounding plate 38 is configured to advantage practically as a full surface area to achieve shielding of the splitter assembly 32. More particularly openings 42 are provided only in portions not taken up by the filter components in the splitter assembly 32. Provided in the rear portion of the grounding plate 38 in this preferred embodiment is a slot 44 and a pointed protuberance 46 by means of which, i.e. its combined spring and "scraping" action, any oxide films existing can be removed to ensure a good electrically conductively connection with the rear rack mounting system.

Referring now to FIG. 3 there is illustrated in a cross-section the configuration of the module 10 in more detail. As evident on the left of FIG. 3 the two isolating modules 30 each comprise isolating contacts 48 consisting of two practically symmetrical "halves" terminated juxtaposed at an isolating location 50, it being at this isolating location 50 that the contact pair can be isolated from the front side of the module 10 by inserting a suitable test or isolating plug. As likewise evident from FIG. 3 the splitter assembly 32 extends by its contacts configured at the front side (not shown in detail in FIG. 3) towards the inner halves of the isolating contacts 48, i.e. towards the lower halves of the upper isolating contacts and the upper halves of the lower isolating contacts, so that an electrically conductive connection is achieved. So that these portions of the isolating contacts 48 are not made use of accidentally for line termination the IDC contacts configured at the front side of the inner rows of the isolating contacts 48 are covered by marking strips 28. It is to be noted that employing usual isolating contacts has the substantial advantage that tried-and-tested configurations can continue to be used.

Evident furthermore from FIG. 3 in cross-section is the grounding plate 38 extending in the embodiment as shown by the finger contacts 40 towards the isolating location 50 of a few contacts of the lower isolating module 30. The contacts connecting the grounding plate 38 are used as shielding wire contacts for terminating and thus for grounding the shielding wires of the subscriber lines. For this purpose in particular a pointed tip 46 configured on the rear side of the grounding plate 38 is electrically conductively connected to a section of a rack mounting system.

Referring now to FIG. 4 there is illustrated a possible advantageous assignment of the contacts of the module as shown in FIGS. 1 to 3. In the uppermost row as shown in FIG. 4 the individual contacts are identified 1 to 20. The second row as shown in FIG. 4 depicts the upper contact row 26 (cf. FIG. 1) of the module and the lower row depicts the lower contact row 20 of the module. Two each of the contacts are needed to terminate a line configured as a pair. The backbone lines are identified P in FIG. 4, P being an abbreviation of POTS (Plain Old Telephone System), i.e. the backbone system. X identifies the XDSL contacts and L the subscriber contacts. The contacts identified s are provided for shielding wires. As evident from FIG. 4 the lines of four subscribers can be terminated by a single module having rows of 20 contacts in both the lower 20 and upper row 26 as indicated by the numbers 1 to 4 prefixing the corresponding letter.

To advantage the backbone lines can be terminated by the both the lower 20 and upper contact row 26. As evident from FIG. 4 the two first contacts of both rows identified 1P are provided for the backbone lines of the first subscriber. Contacts 3 and 4 of the lower row are provided for the subscriber line of the first subscriber. In conclusion, contacts 3 and 4 of the upper row terminate the XDSL line. The shielding wire of the subscriber line can be placed on contact 5 of the lower row 20 as the shielding wire contact, this fifth contact ending the portion of the first subscriber. With the sixth contact the portion of the second subscriber commences which is mirror-inverse to the portion of the first subscriber, this applying likewise for the contacts 11 to 20 provided for subscribers 3 and 4. Due to the fact that the shielding wire contacts of two different subscribers at the contacts 5 and 6 or 15 and 16 respectively are juxtaposed this enhances the neat arrangement and simplifies configuration of the grounding plate since it now needs to comprise corresponding contacts for electrically conductively connecting the shielding wire contacts in only two portions.

Referring now to FIGS. 5 and 6 there is illustrated how enhanced flexibility is attainable due to the fact that backbone lines can now be terminated by the both the lower 20 and upper contact row 26. The reference numeral 52 in FIG. 5 identifies symbolically a subscriber. In the distribution point identified in all by the reference numeral 54 the subscriber line is terminated by the so-called line module 56. Via a conventionally provided patching (cross-connect) jumper 58 the subscriber is connected to the backbone module 60 by flexible ways and means, the backbone module 60 in turn being connected to the exchange (central office) 62. Now, when the terminal block 64 in accordance with the invention is to be "looped" into such a usual arrangement, the subscriber line is guided via the cross-connect side by means of the line 66 to the lower contact row of the terminal block 64, it being due to the splitter provided therein that a signal is directed, for one thing, by the XDSL line 68 to the DSLAM 70, and, for another, the splitting provided by the splitter 32 is such that POTS signals are directed to the so-called backbone contacts of the terminal block 64, preferably those of the upper row which, as evident from FIG. 4, are electrically conductively connected to each other in both the upper and lower row.

If, in looping in terminal block 64 in accordance with the invention as shown in FIG. 5, an existing backbone module 60 is to be retained, this is now possible to advantage in an extremely neat arrangement by connecting the backbone contacts of the terminal block 64 in accordance with the invention via the patching (cross-connect) side, i.e. downwards via a suitable line 72 to the existing backbone module 60. The cross-connect 58 can then be omitted (cf. dashed lines).

Referring now to FIG. 6 there is illustrated how, contrary to the situation above, the backbone module 60 can now be omitted altogether (cf. dashed lines) to advantage. The same as in the circuit as shown in FIG. 5 the terminal block 64 splits the signal coming from the subscriber 52 into a XDSL signal which is directed to the DSLAM 70 terminated by the XDSL contacts in the upper contact row 26 (cf. FIG. 4). Likewise the POTS signal is directed at the upper side and without interposing a further backbone module 60 via the backbone line 74 to the central office 62. To retain the neat arrangement and common architecture of a distribution point the backbone line 74 is terminated in the upper contact row of the terminal block 64. In this variant the conventional backbone terminal module 60 including the cross-connect 58 to the subscriber module 56 and the line leading to the central office can be omitted. More particularly, now when newly configuring a subscriber means the backbone module can now be formed exclusively by the terminal block 64 in accordance with the invention with an integrated splitter. Furthermore, when retrofitting the terminal block 64 in accordance with the invention, and the backbone module 60 including the lines terminated thereby are to be removed, a changeover from the existing system to the new system can now be implemented with no interruption by the connections in the terminal block permitting isolation in accordance with the invention. The new terminal block 64 is namely installed together with all lines terminated thereby and initially isolated by an isolating plug. Then, directly after the existing lines have been isolated, the isolating plug is removed to thus make the new connection. If, however, the backbone module 60 is to be retained, then this too is possible, as shown in FIG. 5, simply by leaving this in place and removing the cross-connect 58, the backbone module 60 then being connected to the cross-connect side of the terminal block 64 in accordance with the invention by tried-and-tested architecture.

The tables as given below show further variants of how to assign the individual contacts of the terminal block in accordance with the invention as an alternative to the wiring scheme according to FIG. 4. It must be noted that the terminal block in accordance with the invention can be used for both a so-called horizontal and a so-called vertical configuration, with the terms "horizontal" and "vertical" relating to the arrangement of oblong troughs to which several terminal blocks in accordance with the invention are mounted juxtaposed or on top of each other, with their side faces 12 lying one next to the other. Accordingly, horizontal configuration means that such a trough is mounted horizontally so that the individual terminal blocks are arranged vertically in that their contact rows extend from top to bottom. The term "horizontal arrangement" has, however, become established in the technical field concerned and will therefore be referred to in this manner. Horizontal mounting arrangements of such troughs are the traditional architecture of distribution points, in particular main distribution frames, on the so-called exchange side. This side, from which the cables extend to an exchange (central office) facility and which previously has always been referred to as "backbone side", is the side on which the troughs are, as already mentioned, traditionally mounted horizontally. The terminal block in accordance with the invention must hence be suitable for this so-called configuration and allow its logical and easily reproducible termination by the individual conductors. In the tables given below, the horizontal configuration is shown in the tables designated "a".

Most recently, the vertical orientation of the troughs as described has become established also regarding the so-called exchange side. In this case, the subscriber line side differs from the exchange side in that the subscriber terminal blocks, i.e. the blocks at which the conductors coming from the subscribers are terminated, are provided in the lower portion of the distribution point, whereas the vertically oriented troughs, from the terminal blocks of which the lines lead to the exchange facility, are to be found in the upper portion of the distribution point. These vertically oriented troughs accommodate the plurality of terminal blocks in a horizontal alignment so that their contact rows extend from the left to the right. Accordingly, each of the tables identified as "b" shows the wiring of an individual terminal block as would be evident from the mounted terminal block. Since, as already mentioned, the contact rows of the terminal blocks extend from top to bottom in the horizontal configuration as explained above, the table identified as "a" must be rotated counterclockwise through 90° before it can show the wiring at the contacts numbered vertically 1 to 20 from top to bottom.

Table 1 shows a presently preferred wiring variant for the terminal block in accordance with the invention. In a comparison with FIG. 4 it is clearly revealed that the grounded contacts identified as "s" provided for the shielding wires were isolated for the respective subscriber. The shielding contacts s in the assignment according to FIG. 4 are, contrary to this arrangement, disposed adjacent to each other at the contacts 5 and 6 for the first subscriber (contacts 1 to 4) and the second subscriber (contacts 7 to 10), whereas in the assignment according to table 1, the same sequence of contacts is adopted for each subscriber. The contacts in the horizontal configuration (table 1a) always have the following sequence (contacts 1 to 20, i.e. from the right to the left): POTS, XDSL or LINE and earth. In the vertical configuration (table 1b), the sequence (here from left to right) is exactly the same as in the horizontal configuration and is advantageously also the same for each subscriber.

This offers the advantage that there can be no confusion when wiring the terminal block since the same wiring scheme materializes for each subscriber. Furthermore, the assignment according to table 1 maintains the advantage that the contact for the shielding wire designated "earth" is located immediately adjacent to the XDSL or subscriber (LINE) contact. This allows the sheath of the pairs concerned to be applied in the vicinity of the contact, which results in an optimum contact with the sheath of the high data rate cables used. Finally, it must be mentioned regarding the wiring scheme according to table 1 that differences result for the terminal block as such, in particular as regards the routing of the conductors on the circuit board of the splitter assembly. Therefore, the terminal block as such must be adapted depending on whether the horizontal or the vertical configuration is realized. However, work on the terminal block offers the decisive advantage as mentioned in that the same wiring scheme applies for each subscriber.

It must be noted with regard to the assignment according to table 1 as well as any other assignment variants to be detailed in the following, that the wiring of a terminal block as described and the pertaining method can be viewed as an innovation independent of the duplicate configuration of the POTS contacts as previously described. In other words, one novel aspect consists in the fact that a terminal block is always wired in the same sequence for each subscriber in the manner described above and with the wires as described. This wiring method and the accordingly wired terminal block offer, as already mentioned, the advantage that there can be no confusion during wiring, and that, advantageously, it is always possible to apply the shielding wire immediately adjacent to the XDSL or subscriber contact.

The assignment alternatives as shown in the remaining tables and the pertaining methods can also result in special advantages in specific applications. For example, the same sequence of assignment, in this case XDSL or LINE, earth and POTS, is always maintained in the assignment according to table 2 for each subscriber. Furthermore, the earth contact can always be advantageously provided adjacent to the XDSL or LINE contact. One advantage of this embodiment consists in the contact to earth being equal for both the horizontal and the vertical configuration. This means that the grounding plate 38 as shown in FIG. 2 does not need to be altered regarding the finger contacts 40 which are electrically conductively connected to the earth contacts. Instead, one and the same grounding plate 38 can be used for both configurations, which results in an advantageous uniformity of the components used.

The assignment according to table 3, in which the XDSL and LINE contact and the two POTS contacts do not lie directly opposite each other but cross-lie so as to cross over each other, offers advantages regarding the routing of the conductors on the circuit board of the splitter assembly. In this embodiment the same assignment scheme is also retained for each subscriber. The alteration in that the earth contact is no longer positioned immediately adjacent to the XDSL contact is acceptable in view of the advantages for the circuit board conductors.

The arrangement according to table 4 allows that the earth is directly adjacent to the XDSL and LINE contacts. As the cross-over scheme in this case is somewhat more complex, this embodiment is advantageous only if it can be expected that the wiring will be carried out with particular care and without confusion.

The assignment according to table 5 dispenses with the aspect of the same assignment scheme being realized for each subscriber. Rather, in this case the POTS contacts and the XDSL and LINE contacts are combined, with an earth contact always lying adjacent to the LINE contacts. Such a wiring scheme can be an advantage in specific applications.

The advantages offered by the assignment according to table 5 can also be obtained by the assignment according to table 6. In this case, the earth contacts are additionally combined so as to result in a neat arrangement and in simplified grounding of the grounding plate.

The previously described embodiments have in common that the XDSL contacts are arranged on the subscriber line side in each case, i.e. in the vertical configuration in a main distribution frame, on the side on which the contacts leading to the subscribers are located in the lower portion of the main distribution frame. Accordingly, the LINE contacts are situated on the side leading to the exchange facility. It is, however, conceivable under certain circumstances that this may be changed so that the LINE contacts are located on the subscriber line side, i.e. on top in the vertical configuration as shown for the assignment variants according to tables 7 to 9. This means that for the routing of the cables outside the terminal block in accordance with the invention, they must be led, so-to-speak, around the block in order to be inserted into the conduits of the block from which they are routed to the contacts. Such an assignment can, however, be an advantage in certain situations. Apart from this difference, the assignment according to table 7 corresponds to that in table 2, also resulting in the corresponding advantages. With regard to the assignment variants according to tables 7 to 9, it should further be noted that in this case, as indicated in the table, a wide wire guide is adopted for the upper wire guide of the terminal block, whereas a smaller variant may be adopted for the lower wire guide. The contrary is the case in the assignment variants according to tables 1 to 6.

Table 8 shows a further assignment variant in which the same assignment scheme is given to advantage for each subscriber and in which the earth contact may be located adjacent to the LINE or XDSL contact in each case.

Figure 7:
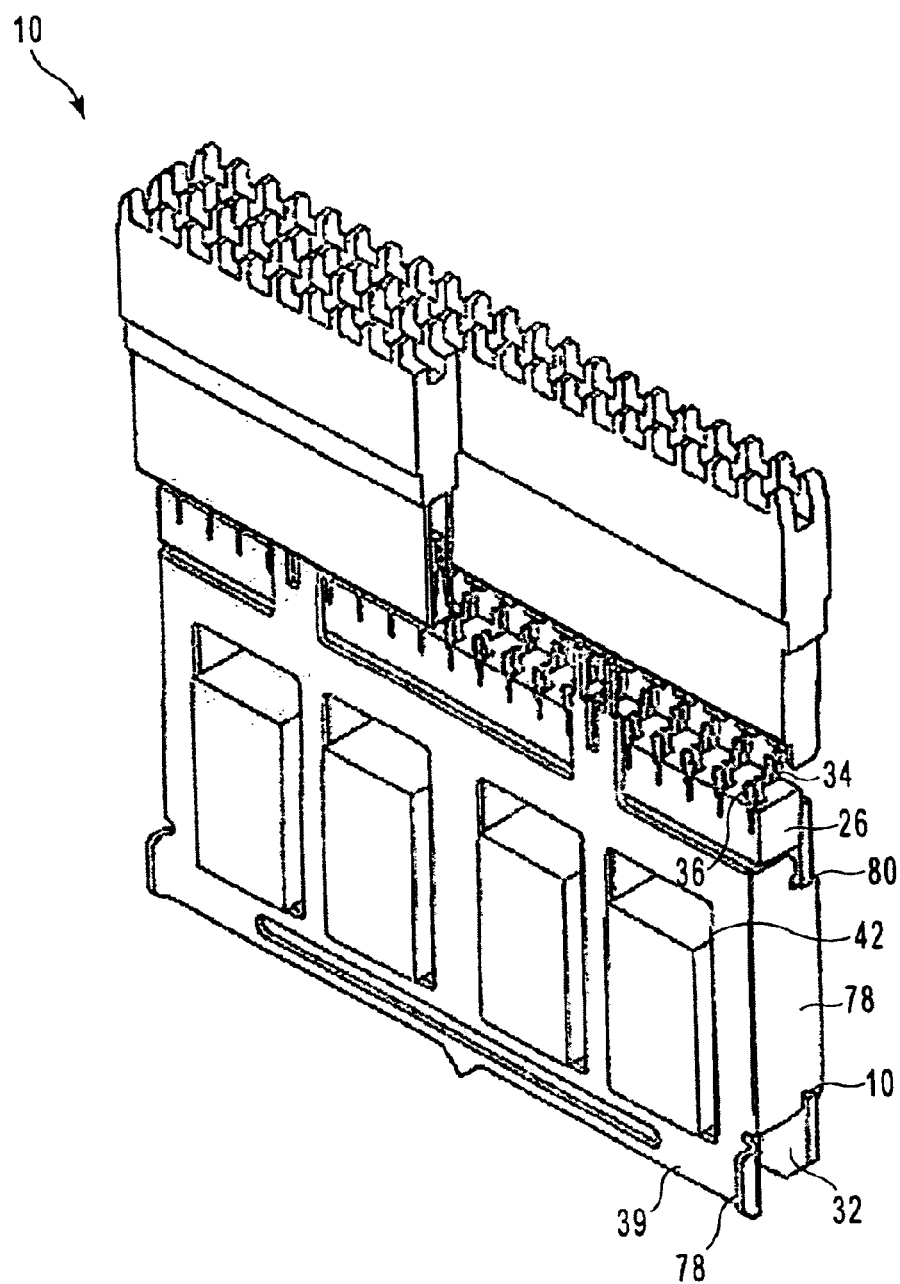
FIG. 7 is a view in perspective of the inner components of a second embodiment of a section or module of the terminal block in accordance with the invention.

The terminal module 10 as depicted in FIG. 7 corresponds substantially to the terminal module as described in connection with FIGS. 1 to 3, apart from the following special aspects. The connection between the splitter assembly 32 is, for one thing, designed differently in that contacts 34 and 36 are configured as tuning fork contacts and mounted in the circuit board of the splitter assembly 32 by means of an edge connector 76. The two legs of the tuning fork contacts 34, 36 substantially grip around the inner ends of contacts 48 (cf. FIG. 3).

Furthermore, the grounding plate 38 serving as a grounding means is also configured differently as it comprises, in particular, larger openings 42 than the embodiment according to FIG. 3. Furthermore, angled items 78, which are provided with suitable supporting means 80 for supporting and keeping in place the circuit board of the splitter assembly 32, are disposed on the two lateral edges. Moreover, reference is hereby made regarding the configuration of the grounding plate 38 to the application "Grounding Plate and Telecommunications Module including a Grounding Plate and Telecommunications Rack-Mounting System including a Module" as filed by the applicant on the same date, the entire disclosure of which is hereby made to the subject matter of the present application.

TABLE 1a

| Wire guide | Subscriber 4/8 | | | | Subscriber 3/7 | | | | Subscriber 2/6 | | | | Subscriber 1/5 | | | |
|---|---|---|---|---|---|---|---|---|---|---|---|---|---|---|---|---|
| Upper disconnecting block | earth | XDSL | | Pots | | earth | XDSL | | Pots | | earth | XDSL | | Pots | | earth | XDSL | | Pots | |
| | s | b | a | b | a | s | b | a | b | a | s | b | a | b | a | s | b | a | b | a |
| Contact | 20 | 19 | 18 | 17 | 16 | 15 | 14 | 13 | 12 | 11 | 10 | 9 | 8 | 7 | 6 | 5 | 4 | 3 | 2 | 1 |
| | s | b | a | b | a | s | b | a | b | a | s | b | a | b | a | s | b | a | b | a |
| lower disconnecting block | earth | Line | | Pots | | earth | Line | | Pots | | earth | Line | | Pots | | earth | Line | | Pots | |
| wire guide | Subscriber 4/8 | | | | Subscriber 3/7 | | | | Subscriber 2/6 | | | | Subscriber 1/5 | | | |

TABLE 1b

| Wire guide | Subscriber 1/5 | | | | Subscriber 2/6 | | | | Subscriber 3/7 | | | | Subscriber 4/8 | | | |
|---|---|---|---|---|---|---|---|---|---|---|---|---|---|---|---|---|
| Upper disconnecting block | Pots | | XDSL | | earth | Pots | | XDSL | | earth | Pots | | XDSL | | earth | Pots | | XDSL | | earth |
| | a | b | a | b | s | a | b | a | b | s | a | b | a | b | s | a | b | a | b | s |
| Contact | 1 | 2 | 3 | 4 | 5 | 6 | 7 | 8 | 9 | 10 | 11 | 12 | 13 | 14 | 15 | 16 | 17 | 18 | 19 | 20 |
| | a | b | a | b | s | a | b | a | b | s | a | b | a | b | s | a | b | a | b | s |
| lower disconnecting block | Pots | | Line | | earth | Pots | | Line | | earth | Pots | | Line | | earth | Pots | | Line | | earth |
| wire guide | Subscriber 1/5 | | | | Subscriber 2/6 | | | | Subscriber 3/7 | | | | Subscriber 4/8 | | | |

TABLE 2a

| Wire guide | Subscriber 4/8 | | | | Subscriber 3/7 | | | | Subscriber 2/6 | | | | Subscriber 1/5 | | | |
|---|---|---|---|---|---|---|---|---|---|---|---|---|---|---|---|---|
| Upper disconnecting block | Pots | | earth | XDSL | Pots | | earth | XDSL | Pots | | earth | XDSL | Pots | | earth | XDSL |
| | b | a | s | b a | b | a | s | b a | b | a | s | b a | b | a | s | b a |
| Contact | 20 | 19 | 18 | 17 16 | 15 | 14 | 13 | 12 11 | 10 | 9 | 8 | 7 6 | 5 | 4 | 3 | 2 1 |
| | b | a | s | b a | b | a | s | b a | b | a | s | b a | b | a | s | b a |
| lower disconnecting block | Pots | | earth | Line | Pots | | earth | Line | Pots | | earth | Line | Pots | | earth | Line |
| wire guide | Subscriber 4/8 | | | | Subscriber 3/7 | | | | Subscriber 2/6 | | | | Subscriber 1/5 | | | |

TABLE 2b

| Wire guide | Subscriber 1/5 | | | | Subscriber 2/6 | | | | Subscriber 3/7 | | | | Subscriber 4/8 | | | |
|---|---|---|---|---|---|---|---|---|---|---|---|---|---|---|---|---|
| Upper disconnecting block | XDSL | | earth | Pots | XDSL | | earth | Pots | XDSL | | earth | Pots | XDSL | | earth | Pots |
| | a | b | s | a b | a | b | s | a b | a | b | s | a b | a | b | s | a b |
| Contact | 1 | 2 | 3 | 4 5 | 6 | 7 | 8 | 9 10 | 11 | 12 | 13 | 14 15 | 16 | 17 | 18 | 19 20 |
| | a | b | s | a b | a | b | s | a b | a | b | s | a b | a | b | s | a b |
| lower disconnecting block | Line | | earth | Pots | Line | | earth | Pots | Line | | earth | Pots | Line | | earth | Pots |
| wire guide | Subscriber 1/5 | | | | Subscriber 2/6 | | | | Subscriber 3/7 | | | | Subscriber 4/8 | | | |

TABLE 3a

| Wire guide | Subscriber 4/8 | | | | Subscriber 3/7 | | | | Subscriber 2/6 | | | | Subscriber 1/5 | | | |
|---|---|---|---|---|---|---|---|---|---|---|---|---|---|---|---|---|
| Upper disconnecting block | earth | Pots | | XDSL | earth | Pots | | XDSL | earth | Pots | | XDSL | earth | Pots | | XDSL |
| | s | b | a | b a | s | b | a | b a | s | b | a | b a | s | b | a | b a |
| Contact | 20 | 19 | 18 | 17 16 | 15 | 14 | 13 | 12 11 | 10 | 9 | 8 | 7 6 | 5 | 4 | 3 | 2 1 |
| | s | b | a | b a | s | b | a | b a | s | b | a | b a | s | b | a | b a |
| lower disconnecting block | earth | Line | | Pots | earth | Line | | Pots | earth | Line | | Pots | earth | Line | | Pots |
| wire guide | Subscriber 4/8 | | | | Subscriber 3/7 | | | | Subscriber 2/6 | | | | Subscriber 1/5 | | | |

TABLE 3b

| Wire guide | Subscriber 1/5 | | | | Subscriber 2/6 | | | | Subscriber 3/7 | | | | Subscriber 4/8 | | | |
|---|---|---|---|---|---|---|---|---|---|---|---|---|---|---|---|---|
| Upper disconnecting block | XDSL | | Pots | earth | XDSL | | Pots | earth | XDSL | | Pots | earth | XDSL | | Pots | earth |
| | a | b | a | b s | a | b | a | b s | a | b | a | b s | a | b | a | b s |
| Contact | 1 | 2 | 3 | 4 5 | 6 | 7 | 8 | 9 10 | 11 | 12 | 13 | 14 15 | 16 | 17 | 18 | 19 20 |
| | a | b | a | b s | a | b | a | b s | a | b | a | b s | a | b | a | b s |
| lower disconnecting block | Pots | | Line | earth | Pots | | Line | earth | Pots | | Line | earth | Pots | | Line | earth |
| wire guide | Subscriber 1/5 | | | | Subscriber 2/6 | | | | Subscriber 3/7 | | | | Subscriber 4/8 | | | |

TABLE 4a

| Wire guide | Subscriber 4/8 | | | | Subscriber 3/7 | | | | Subscriber 2/6 | | | | Subscriber 1/5 | | | |
|---|---|---|---|---|---|---|---|---|---|---|---|---|---|---|---|---|
| Upper disconnecting block | XDSL | | earth | Pots | XDSL | | earth | Pots | XDSL | | earth | Pots | XDSL | | earth | Pots |
| | b | a | s | b a | b | a | s | b a | b | a | s | b a | b | a | s | b a |
| Contact | 20 | 19 | 18 | 17 16 | 15 | 14 | 13 | 12 11 | 10 | 9 | 8 | 7 6 | 5 | 4 | 3 | 2 1 |
| | b | a | b | a s | b | a | b | a s | b | a | b | a s | b | a | b | a s |
| lower disconnecting block | Pots | | Line | earth | Pots | | Line | earth | Pots | | Line | earth | Pots | | Line | earth |
| wire guide | Subscriber 4/8 | | | | Subscriber 3/7 | | | | Subscriber 2/6 | | | | Subscriber 1/5 | | | |

TABLE 4b

| Wire guide | Subscriber 1/5 | | | | Subscriber 2/6 | | | | Subscriber 3/7 | | | | Subscriber 4/8 | | | |
|---|---|---|---|---|---|---|---|---|---|---|---|---|---|---|---|---|
| Upper disconnecting block | Pots | | earth | XDSL | Pots | | earth | XDSL | Pots | | earth | XDSL | Pots | | earth | XDSL |
| | a | b | s | a b | a | b | s | a b | a | b | s | a b | a | b | s | a b |
| Contact | 1 | 2 | 3 | 4 5 | 6 | 7 | 8 | 9 10 | 11 | 12 | 13 | 14 15 | 16 | 17 | 18 | 19 20 |
| | s | a | b | a b | s | a | b | a b | s | a | b | a b | s | a | b | a b |
| lower disconnecting block | earth | Line | | Pots | earth | Line | | Pots | earth | Line | | Pots | earth | Line | | Pots |
| wire guide | Subscriber 1/5 | | | | Subscriber 2/6 | | | | Subscriber 3/7 | | | | Subscriber 4/8 | | | |

TABLE 5a

| Wire guide | | | | | | | | | | | | | | | | |
|---|---|---|---|---|---|---|---|---|---|---|---|---|---|---|---|---|
| Upper disconnecting block | Pots 4 | | Pots 3 | | Pots 2 | | Pots 1 | | earth | XDSL 4 | earth | XDSL 3 | earth | XDSL 2 | earth | XDSL 1 |
| | b | a | b | a | b | a | b | a | s | b a | s | b a | s | b a | s | b a |
| Contact | 20 | 19 | 18 | 17 | 16 | 15 | 14 | 13 | 12 | 11 10 | 9 | 8 7 | 6 | 5 4 | 3 | 2 1 |
| | b | a | b | a | b | a | b | a | s | b a | s | b a | s | b a | s | b a |

TABLE 5a-continued

| lower disconnecting block wire guide | Pots 4 | | Pots 3 | | Pots 2 | | Pots 1 | | earth | | Line 4 | | earth | | Line 3 | | earth | | Line 2 | | earth | | Line 1 | |
|---|---|---|---|---|---|---|---|---|---|---|---|---|---|---|---|---|---|---|---|---|---|---|---|---|

TABLE 5b

| Wire guide | | | | | | | | | | | | | | | | | | | | | |
|---|---|---|---|---|---|---|---|---|---|---|---|---|---|---|---|---|---|---|---|---|---|
| Upper disconnecting block | XDSL 1 | | earth | XDSL 2 | | earth | XDSL 3 | | earth | XDSL 4 | | Pots 1 | | Pots 2 | | Pots 3 | | Pots 4 | |
| | a | b | s | a | b | s | a | b | s | a | b | s | a | b | a | b | a | b | a | b |
| Contact | 1 | 2 | 3 | 4 | 5 | 6 | 7 | 8 | 9 | 10 | 11 | 12 | 13 | 14 | 15 | 16 | 17 | 18 | 19 | 20 |
| | a | b | s | a | b | s | a | b | s | a | b | s | a | b | a | b | a | b | a | b |
| lower disconnecting block wire guide | Line 1 | | earth | Line 2 | | earth | Line 3 | | earth | Line 4 | | Pots 1 | | Pots 2 | | Pots 3 | | Pots 4 | |

TABLE 6a

| Wire guide | | | | | | | | | X | X | | | | | X | X | | | | |
|---|---|---|---|---|---|---|---|---|---|---|---|---|---|---|---|---|---|---|---|---|
| Upper disconnecting block | Pots 4 | | Pots 3 | | Pots 2 | | Pots 1 | | XDSL 4 | | earth | XDSL 3 | | XDSL 2 | | earth | | XDSL 1 | | |
| | b | a | b | a | b | a | b | a | b | a | s | s | b | a | b | a | s | s | b | a |
| Contact | 20 | 19 | 18 | 17 | 16 | 15 | 14 | 13 | 12 | 11 | 10 | 9 | 8 | 7 | 6 | 5 | 4 | 3 | 2 | 1 |
| | b | a | b | a | b | a | b | a | b | a | s | s | b | a | b | a | s | s | b | a |
| lower disconnecting block | Pots 4 | | Pots 3 | | Pots 2 | | Pots 1 | | Line 4 | | earth | | Line 3 | | Line 2 | | earth | | Line 1 | |
| wire guide | | | | | | | | | | | X | X | | | | | X | X | | |

TABLE 6b

| Wire guide | | | X | X | | | | X | X | | | | | | | | | | | |
|---|---|---|---|---|---|---|---|---|---|---|---|---|---|---|---|---|---|---|---|---|
| Upper disconnecting block | XDSL 1 | | earth | | XDSL 2 | | XDSL 3 | | earth | | XDSL 4 | | Pots 1 | | Pots 2 | | Pots 3 | | Pots 4 | |
| | a | b | s | s | a | b | a | b | s | s | a | b | a | b | a | b | a | b | a | b |
| Contact | 1 | 2 | 3 | 4 | 5 | 6 | 7 | 8 | 9 | 10 | 11 | 12 | 13 | 14 | 15 | 16 | 17 | 18 | 19 | 20 |
| | a | b | s | s | a | b | a | b | s | s | a | b | a | b | a | b | a | b | a | b |
| lower disconnecting block | XDSL 1 | | earth | | XDSL 2 | | XDSL 3 | | earth | | XDSL 4 | | Pots 1 | | Pots 2 | | Pots 3 | | Pots 4 | |
| wire guide | | | X | X | | | | | X | X | | | | | | | | | | |

TABLE 7a

| | wide wire guide | | | | | | | | | | | | | | | | | | | |
|---|---|---|---|---|---|---|---|---|---|---|---|---|---|---|---|---|---|---|---|---|
| Wire guide | Subscriber 4/8 | | | | | | Subscriber 3/7 | | | | | | Subscriber 2/6 | | | | | Subscriber 1/5 | | |
| Upper disconnecting block | Pots | | earth | Line | | Pots | | earth | Line | | Pots | | earth | Line | | Pots | | earth | Line | |
| | b | a | s | b | a | b | a | s | b | a | b | a | s | b | a | b | a | s | b | a |
| Contact | 20 | 19 | 18 | 17 | 16 | 15 | 14 | 13 | 12 | 11 | 10 | 9 | 8 | 7 | 6 | 5 | 4 | 3 | 2 | 1 |
| | b | a | s | b | a | b | a | s | b | a | b | a | s | b | a | b | a | s | b | a |
| lower disconnecting block | Pots | | earth | XDSL | | Pots | | earth | XDSL | | Pots | | earth | XDSL | | Pots | | earth | XDSL | |
| wire guide | Subscriber 4/8 | | | | | Subscriber 3/7 | | | | | Subscriber 2/6 | | | | | Subscriber 1/5 | | | | |
| | narrow wire guide | | | | | | | | | | | | | | | | | | | |

TABLE 7b

| | wide wire guide | | | | | | | | | | | | | | | | | | | |
|---|---|---|---|---|---|---|---|---|---|---|---|---|---|---|---|---|---|---|---|---|
| Wire guide | Subscriber 1/5 | | | | | Subscriber 2/6 | | | | | Subscriber 3/7 | | | | | Subscriber 4/8 | | | | |
| Upper disconnecting block | Line | | earth | Pots | | Line | | earth | Pots | | Line | | earth | Pots | | Line | | earth | Pots | |
| | a | b | s | a | b | a | b | s | a | b | a | b | s | a | b | a | b | s | a | b |
| Contact | 1 | 2 | 3 | 4 | 5 | 6 | 7 | 8 | 9 | 10 | 11 | 12 | 13 | 14 | 15 | 16 | 17 | 18 | 19 | 20 |
| | a | b | s | a | b | a | b | s | a | b | a | b | s | a | b | a | b | s | a | b |
| lower disconnecting block | XDSL | | earth | Pots | | XDSL | | earth | Pots | | XDSL | | earth | Pots | | XDSL | | earth | Pots | |
| wire guide | Subscriber 1/5 | | | | | Subscriber 2/6 | | | | | Subscriber 3/7 | | | | | Subscriber 4/8 | | | | |
| | narrow wire guide | | | | | | | | | | | | | | | | | | | |

TABLE 8a

| | wide wire guide | | | | | | | | | | | | | | | | | | | |
|---|---|---|---|---|---|---|---|---|---|---|---|---|---|---|---|---|---|---|---|---|
| Wire guide | Subscriber 4/8 | | | | | Subscriber 3/7 | | | | | Subscriber 2/6 | | | | | Subscriber 1/5 | | | | |
| Upper disconnecting block | Pots | | Line | | earth | Pots | | Line | | earth | Pots | | Line | | earth | Pots | | Line | | earth |
| | b | a | b | a | s | b | a | b | a | s | b | a | b | a | s | b | a | b | a | s |
| Contact | 20 | 19 | 18 | 17 | 16 | 15 | 14 | 13 | 12 | 11 | 10 | 9 | 8 | 7 | 6 | 5 | 4 | 3 | 2 | 1 |
| | b | a | b | a | a | b | a | b | a | a | b | a | b | a | a | b | a | b | a | a |

TABLE 8a-continued

| lower disconnecting block wire guide | Pots | XDSL Subscriber 4/8 | earth | Pots | XDSL Subscriber 3/7 narrow wire guide | earth | Pots | XDSL Subscriber 2/6 | earth | Pots | XDSL Subscriber 1/5 | earth |
|---|---|---|---|---|---|---|---|---|---|---|---|---|

TABLE 8b

| | wide wire guide | | | | | | | | | | | | | | | |
|---|---|---|---|---|---|---|---|---|---|---|---|---|---|---|---|---|
| Wire guide | Subscriber 1/5 | | | Subscriber 2/6 | | | Subscriber 3/7 | | | Subscriber 4/8 | | |
| Upper disconnecting block | earth | Line | Pots | earth | Line | Pots | earth | Line | Pots | earth | Line | Pots |
| | s | a b | a b | s | a b | a b | s | a b | a b | s | a b | a b |
| Contact | 1 | 2 3 | 4 5 | 6 | 7 8 | 9 10 | 11 | 12 13 | 14 15 | 16 | 17 18 | 19 20 |
| | s | a b | a b | s | a b | a b | s | a b | a b | s | a b | a b |
| lower disconnecting block wire guide | earth | XDSL Subscriber 1/5 | Pots | earth | XDSL Subscriber 2/6 narrow wire guide | Pots | earth | XDSL Subscriber 3/7 | Pots | earth | XDSL Subscriber 4/8 | Pots |

What is claimed is:

1. A terminal block of a telecommunications distribution point, comprising
    at least one group of subscriber contacts,
    at least one group of XDSL contacts,
    at least two groups of backbone contacts, each backbone contact of the first group being connected to a backbone contact of the second group, and
    at least one splitter assembly connected to said subscriber contacts, said XDSL contacts and said backbone contacts of said first and/or second group.

2. The terminal block as set forth in claim 1, wherein said backbone contacts of said first and second group are connected to each other by means of said splitter assembly.

3. The terminal block as set forth in claim 1, wherein said contacts of said splitter assembly are directly electrically conductively connected to said contacts of said terminal block.

4. The terminal block as set forth in claim 1, wherein said splitter assembly is arranged behind the contacts of said terminal block.

5. A distribution point including at least one terminal block as set forth claim 1.

6. The terminal block as set forth in claim 1, wherein the contacts of at least one group comprise isolating contacts.

7. The terminal block as set forth in claim 6, wherein said subscriber contacts comprise isolating contacts.

8. The terminal block as set forth in claim 1, wherein said splitter assembly comprises contacts.

9. The terminal block as set forth in claim 8, wherein the contacts of the splitter assembly are arranged in two rows.

10. The terminal block as set forth in claim 1, wherein said terminal block comprises wire guides.

11. The terminal block as set forth in claim 10, wherein said wire guides are configured as conduits.

12. The terminal block as set forth in claim 1, wherein said subscriber contacts and said backbone contacts of said first group are arranged in a first common row, and said XDSL contacts and said backbone contacts of said second group are arranged in a second common row.

13. The terminal block as set forth in claim 12, wherein said subscriber contacts and said backbone contacts of said first group are arranged in a lower row.

14. The terminal block as set forth in claim 13, wherein said XDSL contacts and said backbone contacts of said second group are arranged in an upper row.

15. The terminal block as set forth in claim 1, further comprising shielding wire contacts in contact with a grounding means.

16. The terminal block as set forth in claim 15, wherein said grounding means is configured practically in a full surface area.

17. The terminal block as set forth in claim 15, wherein said grounding means is a grounding plate having contacts that connect to the wire contacts.

18. The terminal block as set forth in claim 15, wherein said grounding means comprises supporting means for accommodating a circuit board of said splitter assembly.

* * * * *

UNITED STATES PATENT AND TRADEMARK OFFICE
CERTIFICATE OF CORRECTION

PATENT NO. : 7,018,229 B2 Page 1 of 1
APPLICATION NO. : 10/472019
DATED : March 28, 2006
INVENTOR(S) : Hans-Dieter Otto It is certified that error appears in the above-identified patent and that said Letters Patent is hereby corrected as shown below:

On the title page item (75), line 8, delete "Bochum" and insert -- Witten --, therefore.

Column 8, line 12, after "identified" delete "s" and insert -- as "s" --, therefore.

Column 17, line 22, in claim 1, after "comprising" insert -- : --.

Column 17, line 43, in claim 5, after "set forth" insert -- in --.

Signed and Sealed this

Tenth Day of October, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,018,229 B2 |
| APPLICATION NO. | : 10/472019 |
| DATED | : March 28, 2006 |
| INVENTOR(S) | : Hans-Dieter Otto |

It is certified that error appears in the above-identified patent and that said Letters Patent is hereby corrected as shown below:

Title page, item [75], (inventors), line 8, delete "Bochum" and insert --Witten --, therefore.

Column 8, line 12, after "identified" delete "s" and insert -- as "s" --, therefore.

Column 17, line 22, in claim 1, after "comprising" insert -- : --.

Column 17, line 43, in claim 5, after "set forth" insert -- in --.

Signed and Sealed this

Twenty-first Day of November, 2006

JON W. DUDAS
*Director of the United States Patent and Trademark Office*